Figure 1:
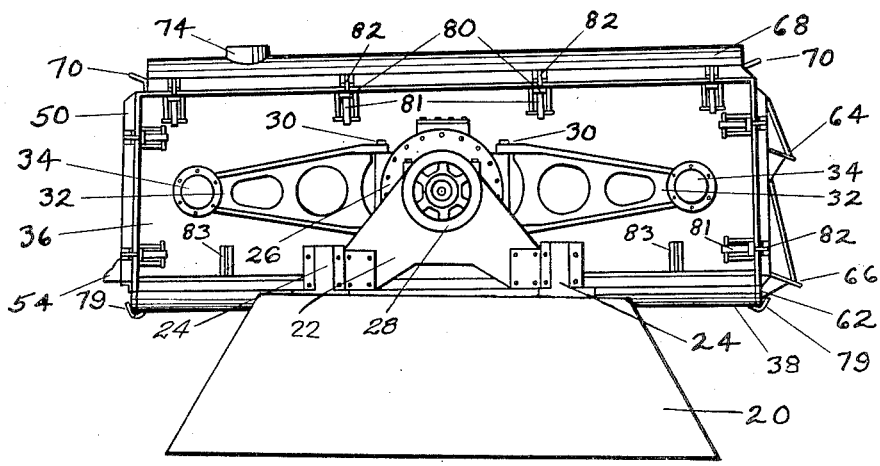

Aug. 11, 1953     L. E. SOLDAN     2,648,441
VIBRATING EQUIPMENT
Filed Jan. 17, 1948     3 Sheets-Sheet 1

INVENTOR
LEWIS E. SOLDAN
Rey Eilers
ATTORNEY

Aug. 11, 1953     L. E. SOLDAN     2,648,441
VIBRATING EQUIPMENT
Filed Jan. 17, 1948     3 Sheets-Sheet 2

INVENTOR
LEWIS E. SOLDAN
Ray Eilers
ATTORNEY

Aug. 11, 1953     L. E. SOLDAN     2,648,441
VIBRATING EQUIPMENT

Filed Jan. 17, 1948     3 Sheets-Sheet 3

INVENTOR
LEWIS E. SOLDAN
Rey Eilers
ATTORNEY

Patented Aug. 11, 1953

2,648,441

UNITED STATES PATENT OFFICE 2,648,441

VIBRATING EQUIPMENT

Lewis E. Soldan, San Diego, Calif., assignor to Productive Equipment Corporation, Chicago, Ill., a corporation of Illinois Application January 17, 1948, Serial No. 2,840

5 Claims. (Cl. 210—155)

This invention relates to improvements in vibrating equipment. More particularly this invention relates to improvements in vibrating equipment that can be used to impart controlled vibrations to mixtures of fluids and solids to separate same.

It is therefore an object of the present invention to provide an improved vibrating device which can be used to impart controlled vibrations to mixtures of fluids and solids to separate same.

In many industries, as for example the food industry, it is frequently desirable to separate the liquid components of a material or a mixture of materials from the solid or semi-solid components of that material or mixture. Specifically, it is frequently desirable to separate the juices of certain fruits and vegetables from the solid or semi-solid matter of those fruits and vegetables. This separation can be effected quite easily and quite completely by passing the fruits or vegetables through a chopping device and then placing the chopped material on a porous screen which is vibrated at high speed. The vibration of the screen will agitate the chopped material so vigorously that a high percentage of the liquid in the chopped material will pass through the pores of the screen where it can be collected and drawn off. The large components of the solid or semi-solid portions of the material will not pass through the screen, but instead can be removed as desired from the top of that screen. By proper selection of the pore size for the screen, and by proper chopping of the material, it is possible to remove practically all of the liquid from the material.

It is of the greatest importance, where that process is used in the food industry, that every precaution be taken to keep the liquid and the solid or semi-solid components of the material from contamination or adulteration. In addition it is necessary that the vibrating equipment which carries, and imparts controlled vibrations to, the porous screen be of such a character that it can be disassembled easily and thoroughly cleaned. Moreover, it is necessary that the vibrating equipment be so constructed that it does not leak since the liquid components of foods often contain valuable vitamins and minerals. In the past, vibrating equipment has been used to separate the liquid components of food products from the solid or semi-solid components of those products, but that vibrating equipment could not keep the various components of the food products free from contamination and adulteration. In addition, that vibration equipment was not easy to clean, and it permitted part of the liquid components of the food products to leak away and be lost. These undesirable results were at least partially due to the use in that equipment of porous screens that had to be tensioned after they were positioned within the vibrating equipment. This tensioning was customarily done by attaching the porous screen to bolts that passed through the side walls of the vibrating equipment, and using nuts onto the projecting ends of the bolts to tighten the screen. The openings, which were provided in the side walls of the vibrating equipment to receive the bolts, permitted some of the liquid components to leak out and be lost. In addition, those openings permitted adulterants and contaminants to enter the vibrating equipment and contact the food products. Moreover, those openings were hard to clean, and they constituted lodging places for food which could act as a culture for bacteria. For these various reasons, prior vibrating equipment for separating the liquid and the semi-solid or solid components of food products are objectionable. The present invention obviates these objections by providing an improved vibrating device which is completely free of openings through the side walls and bottom thereof. Such a device can separate the liquid and the solid or semi-solid components of food products without loss of such products by leakage, and with minimum contamination. It is therefore an object of the present invention to provide an improved vibrating device which has no openings in the side walls or bottom thereof.

The present invention makes this possible, and still provides a tightly tensioned porous screen, by using an interiorly supported pre-tensioned porous screen. This screen can be supported in the vibrating device by interiorly disposed guide members; and thus there is no need of bolts which extend through the sides of the vibrating device. By using such a porous screen, the present invention avoids the influx of contaminants and adulterants through openings in the side walls of the vibrating device, it avoids the efflux of valuable liquid components of the food products, and it eliminates lodging places where food could gather and serve as a culture for bacteria. It is therefore an object of the present invention to provide an improved vibrating device which has an interiorly supported, pre-tensioned porous screen.

In prior vibrating devices for separating the liquid and the solid or semi-solid components of food products, the porous screen had to be tensioned after it was inserted within the vibrating device. In some instances this caused wrinkling of the screen, and in other instances it caused uneven concentrations of force on the screen. The present invention obviates these undesirable results by providing a pre-tensioned screen that is readily insertible into and removable from vibrating devices.

In the operation of vibrating devices that separate the liquid and the solid or semi-solid components of food products, it is necessary that as many parts as possible be removable and that the rest of the parts be easily cleaned. In the present invention, the screen and its clamping members are readily removable, and the rest of the vibrating device is free of cracks and joints in which food could lodge and serve as a culture for bacteria. Avoidance of cracks and fissures is attained by forming fillets, as by soldering, welding or brazing, around those parts of the device that pass through the side walls of the device. As a result, the vibrating device of the present invention can be kept exceptionally clean and sanitary.

In screening food products it is desirable to have the fluid components of those products pass quickly through the screen, and to have the solid and semi-solid components of the food products remain in contact with the screen for a sufficiently long time to permit removal of most of the liquid components. These two conditions can be met by providing long screens on which the solid or semi-solid components can remain for appreciable periods of time. However, such screens are expensive, and the vibrating equipment for those screens is even more expensive. The present invention attains the same results which can be secured by the use of long screens, but it does so at reduced cost by using short screens that are inclined upwardly and cause the food products to climb upwardly against the force of gravity. This has the effect of compacting the solid or semi-solid material as it moves up the screen, thus concentrating it and insuring that a relatively small area of screen will do as much or more work than the corresponding area of a horizontally disposed screen. It is therefore an object of the present invention to provide a vibrating device wherein the food products to be separated are applied at the lower end of the screen and wherein the solid or semi-solid components of those products are moved upwardly along the screen while the liquid components of those products pass through the screen.

To facilitate the movement of the solid or semi-solid components of the food products upwardly along the screen, the present invention provides a product-directing plate adjacent the lower end of the screen. Moreover, the present invention provides a product-directing chute that directs the chopped mixture toward the product-directing plate, thus enabling that plate to receive all of the incoming mixture and start it up the screen. This speeds up the screening process and increases the capacity of the vibrating device.

By having a unitary porous screen that is bodily removable from the vibrating device, the present invention makes it possible to alternate several porous screens. Thus it is possible to give the screens prolonged scouring or scalding without keeping the vibrating device idle.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purposes of illustration only and do not limit the invention and that the invention will be defined by the appended claims.

In the drawing

Figure 2:
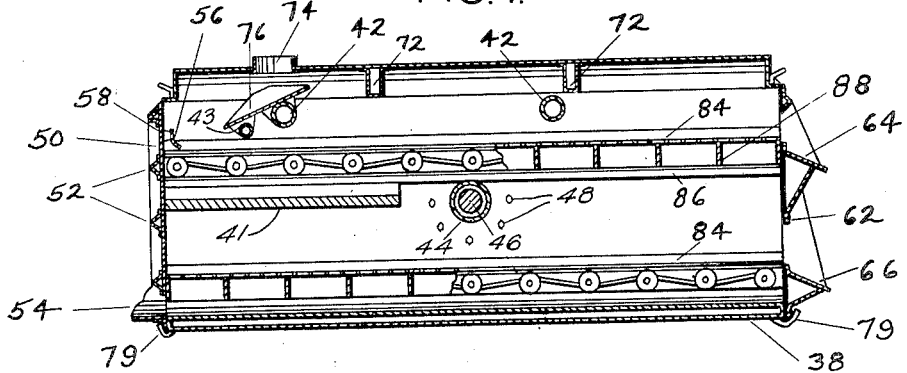
Figure 3:
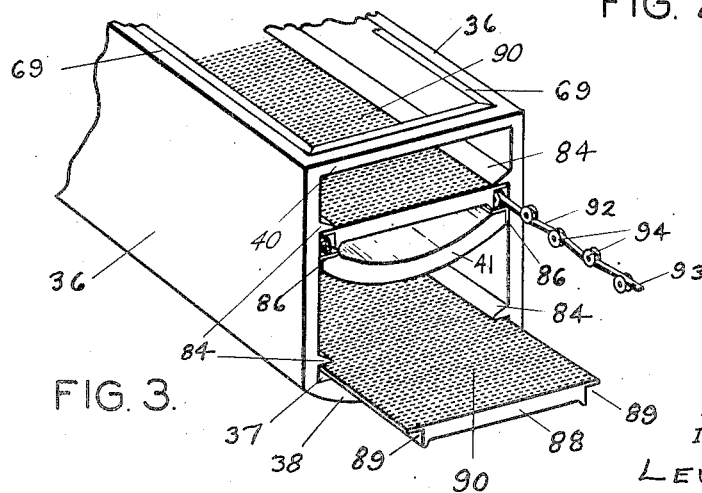
Figure 4:
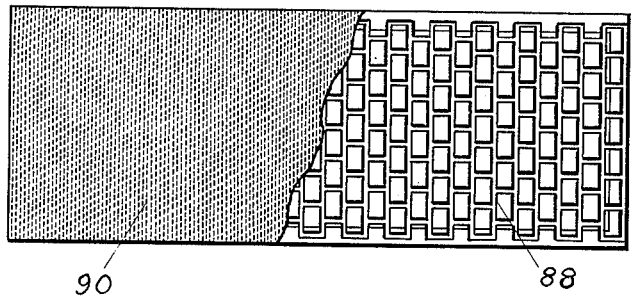
Figures 5, 6:
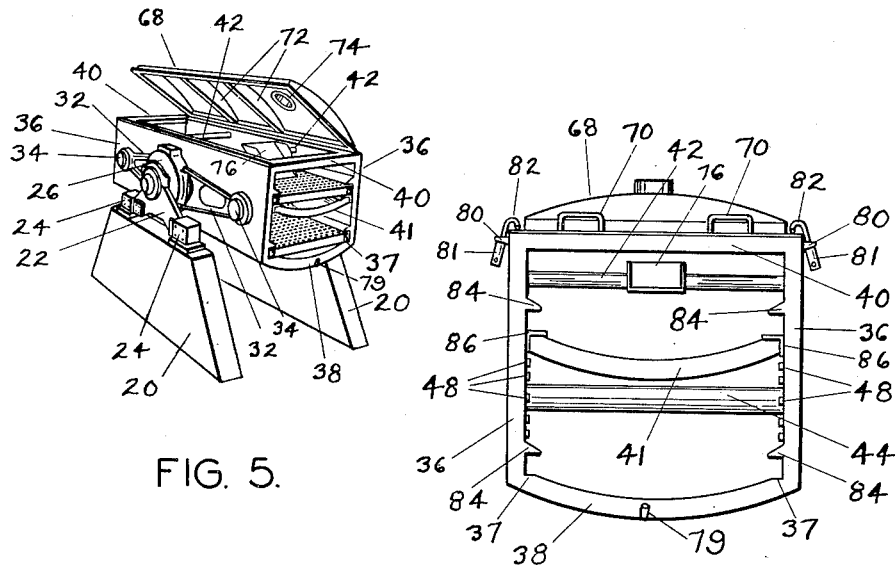
Figure 7:
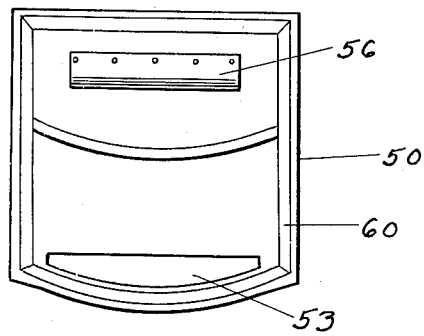
Figure 8:
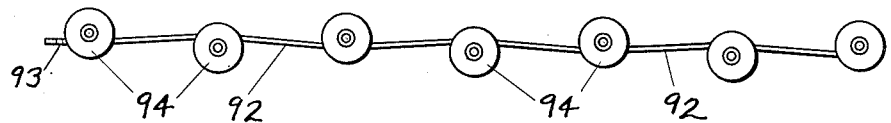
Figure 9:
Figure 10:
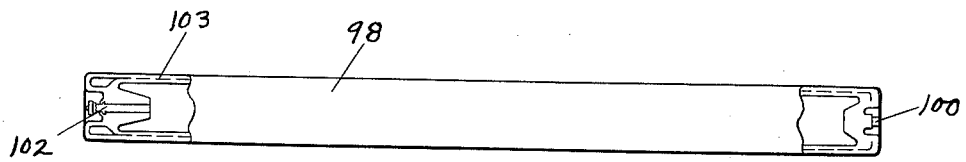

Fig. 1 is a side elevational view of a vibrating device incorporating the principles and teachings of the present invention, Fig. 2 is a cross sectional view of a portion of the vibrating device shown in Fig. 1, Fig. 3 is a partial view, in perspective, of the vibrating device shown in Figs. 1 and 2, and it shows that device without its cover and end plates, Fig. 4 is a partially sectioned plan view of the porous screen used with the vibrating device of Figs. 1–3, Fig. 5 is a perspective view showing the other end of the vibrating device of Fig. 1, and it shows that device as it appears when the cover is lifted and the end plate is removed, Fig. 6 is an incomplete end view through the vibrating device of Fig. 5, and it shows the interior of that device, Fig. 7 is a front elevational view of an end plate usable with the vabrating device of Figs. 1–3, 5 and 6, Fig. 8 is a side elevational view of a retaining device usable with the vibrating device shown in Figs. 1–3, 5 and 6, Fig. 9 is a side elevational view of another retaining device usable with the vabrating device of Figs. 1–3, 5 and 6, Fig. 10 is a side elevational view of a resilient retaining member usable with the vibrating device of Figs. 1–3, 5 and 6, and Fig. 11 is an end elevational view of the vibrating device of Figs. 5 and 6, as that device has the retaining member of Fig. 10 installed in it.

Referring to the drawing in detail, the numeral 20 denotes a stationary base for a vibrating device. This base can be made of two spaced members, as shown in Fig. 5; and those members will be supported on the floor or other foundation of the structure in which the vibrating device is operated. The numeral 22 denotes a generally triangular bracket, of the vibrating device, which has feet 24 that extend toward and are supported by the two spaced members of the base 20. The generally triangular bracket 22 rotatably supports the cylindrical housing 26 of the vibrating device; and rotation of the cylindrical housing 26 relative to the generally triangular bracket 22 permits the vibrating device to be set and maintained at any suitable inclination relative to the bracket 22, and thus relative to the base 20. Suitable clamping means, not shown, is provided to maintain the desired inclination of housing 26 relative to bracket 22.

The numeral 28 denotes a pulley which can be connected to a motor, positioned adjacent one of the spaced members of the base 20, and that pulley will drive the vibration-imparting elements positioned within the cylindrical housing 26. The cylindrical housing 26 has two vertically disposed pins 30 on the opposite sides of the exterior thereof, and the pins 30 carry supporting arms 32. These supporting arms are provided with cup-like portions 34 that telescope over projections, not shown, on the side walls 36 of the vibrating device; thus serving to support the vibrating device and keep it resiliently mounted relative to the base 20. The particular construction and arrangement of the cylindrical housing 26, the pivots 30, the supporting arms 32, and the various features of the vibration-imparting equipment may be of the type disclosed in my Letters Patent No. 2,238,711, issued April 15, 1941. However, since the particular vibration-imparting constructions used with the device of the present invention is not the essence of the present invention, other vibration-imparting constructions could also be used with the vibrating device of the present invention.

The body portion of the vibrating device of the present invention has two spaced side walls 36 which are connected together by an arcuate bottom 38. Where the vibrating device is used in the food industry, and it is particularly useful in that industry, that device will be made of a metal which is resistant to the action of juices and other liquid components of the fruits, vegetables and other foods to be treated. One such metal is stainless steel; and when the vibrating device of the present invention has been made of stainless steel it has been found to be extremely satisfactory. The side walls 36 and the bottom 38 are preferably so formed and related together that there is no visible seam or joint between the two; and any seam that is formed between the side walls 36 and the bottom 38 during fabrication is preferably filled with sliver solder, a braze, a weld, or other types of solder. Where this is done, there is no possibility of the liquid components of the foods getting into small cracks between the side walls 36 and the bottom 38 and serving as a culture for the growth of bacteria.

The upper portions of the side walls 36 are spaced apart by transversely extending spacing bars 40 which are located at the ends of the side walls 36. Any seams or joints formed between the spacing bars 40 and the side walls 36 during the fabrication of the vibrating device, are preferably filled with silver solder, a braze, a weld, or other solder, to prevent the lodgment of liquid components of food products which would serve as cultures for the growth of bacteria. An arcuate liquid-directing pan 41 is positioned below the spacing bar 40 at the lower end of the vibrating device. This pan 41 acts to provide additional strength and rigidity for the vibrating device, but its principal function is to receive the fluid components from the lower end of the upper porous screen and direct those components toward the middle of the lower porous screen. Where this is done, a more even distribution of material is provided for the lower porous screen; and the lower end of the lower porous screen will not be clogged up. The pan 41 must be shorter than the side walls 36 of the vibrating device, and it is preferably about one-third (⅓) to one-half (½) the length of one of those side walls. Any joints or seams between the side walls 36 and the arcuate pan 41 are preferably filled with silver solder, a braze, a weld, or other solder to prevent the lodgment of liquid components of food products that could serve as cultures for the growth of bacteria. Two cylindrical stiffening rods 42 are positioned between and engage the side walls 36 of the vibrating device; and those rods are spaced inwardly from the ends of the side walls 36. One of those rods cooperates with a rod 43 to support a directing plate 76. The seams or joints between the bars 42 and 43 and the side walls 36 of the vibrating device are also preferably filled so there is not the slightest crack or fissure in which the liquid components of food products could lodge and serve as a culture for the growth of bacteria. A hollow shaft 44, of the type shown and described in my Letters Patent No. 2,238,711, is fixedly secured to and extends between the side walls 36 of the vibrating device. This shaft actually extends through the side walls 36 of the vibrating device, although the outer portions of that shaft are not shown in Figs. 6 and 11. A connecting shaft 46 is rotatably positioned within the hollow shaft tube 44; and it is supported by the rotatable vibration-imparting elements, not shown, which are positioned in cylindrical housings 26. The connecting shaft 46 serves the function of positively interrelating the rotation of the vibration-imparting elements, positioned in the cylindrical housings 26 on opposite sides of the vibrating device, and keeping them in constant synchronism. A plurality of bolts 48 extends through the side walls of the device 36, and those bolts extend into the cylindrical housings 26 for the vibration-imparting elements.

Figure 11:
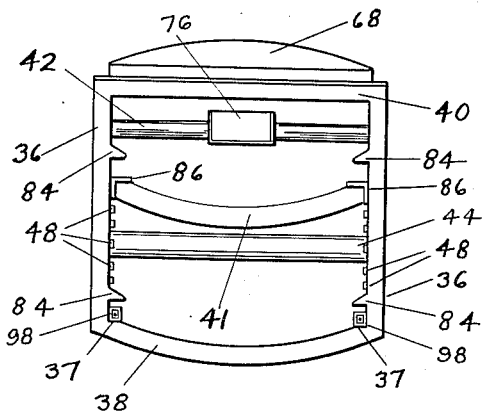

In Figs. 6 and 11, the portions of the hollow shaft 44 which extend outwardly beyond the side walls 36 of the vibrating device are not shown; and similarly, the portions of the bolts 48 which extend outwardly beyond the side walls 36 of the vibrating device are not shown. Actually, the ends of the hollow shaft 44 and the ends of the bolts 48 do extend outwardly beyond the outer portions of the side walls 36, as disclosed in my Patent No. 2,238,711. However, the particular vibration-imparting structure used to vibrate the device of the present invention is not the essence of the present invention, and too detailed a showing of the vibration-imparting elements might interfere with a full understanding of the present invention. Accordingly, in Figs. 6 and 11, where it is desired to show how clean and free of obstacles the interior of the vibrating device is, the outer portions of hollow shaft 44 and bolts 48 are not shown. The joints or seams between the side walls 36 and the hollow shaft 44 and bolts 48 are preferably silver soldered to keep liquid components of the food from lodging and serving as a culture for bacteria. It will be noted that there are only a few elements projecting inwardly from the side walls 36, and that any joints or seams between those elements are filled to prevent lodgment of liquid components of the food products. Consequently, there is a clean sweep through the vibrating device, and it can be kept clean and sanitary with ease.

The open ends of the vibrating device are closed by end plates. One of those end plates is denoted by the numeral 50 and it is provided, on its outer wall, with stiffening members 52 that extend across the device and hold it rigid against distortion or deformation. An opening 53 is provided in the bottom of the end plate 50, and that opening has a curvature which is complementary to the curvature of the bottom 38 of the vibrating device. A spout 54 is provided adjacent the curved portion of the opening 53 of end plate 50, and that spout conducts the liquid components of food products from the interior of the vibrating device to the exterior of that device where those components can be collected in suitable containers. An arcuate plate 56 is supported adjacent the upper end of the end plate 50, and the plate 56 is supported on studs 58 which project from the inner surface of the end plate 50. This arcuate plate is directed inwardly toward the interior of the vibrating device. The inner surface of the end plate 50 is provided with a gasket 60 which extends around all of the edges of the end plate 50 and also extends across the approximate middle of the end plate 50. The various portions of gasket 60 that are adjacent the top, sides, and bottom of end plate 50 will register respectively with the end faces of spacing bar 40, side walls 36, and bottom 38. The center portion of gasket 60 will register with the arcuate member 41 of the vibrating device. The gasket 60 is made of resilient material, as for example synthetic rubber, which is substantially unaffected by contact with food products and which will not affect or alter the taste of those products. When the end plate 50 is pressed and held against the end of the vibrating device, the gasket 60 will provide a liquid-tight seal between end plate 50 and the vibrating device. In the event any liquid or solid or semi-solid components of the food products were to lodge in the seams or joints between gasket 60 and the spacing bar 40, arcuate member 41, side walls 36, and bottom 38, those components can easily be washed away when the end plate 50 is removed. This is customarily done at least once a day in the food industry, and thus the vibrating device will be kept clean and sanitary.

Another end plate 62 is provided for the other end of the vibrating device, and that end plate is provided with a spout 64 adjacent the upper end of the end plate and a spout 66 adjacent the lower portion of the end plate 62. These two spouts are positioned immediately adjacent openings, not shown, in the end plate 62; and those openings permit the unscreened solid or semi-solid components to move out from the interior of the vibrating device, over the spouts 64 and 66, and into suitable containers. End plate 62 is provided with a gasket similar to the gasket 60 of end plate 50. The gasket on end plate 62 performs the same function as the gasket 60 on end plate 50.

A cover 68 is provided for the vibrating device, and that cover is generally arcuate in form. Stiffening ribs 72 are provided on the inner surface of the cover 68, and any seams or joints between the inner surface of the cover 68 and those ribs are preferably filled with silver solder. Handles 70 are provided on the exterior of the cover 68, and those handles can be used to lift the cover 68 onto and off of the vibrating device. The sides and ends of cover 68 are dimensioned so they overlie the side walls 36 and the cross bars 40 of the vibrating device. A gasket 69 of resilient material, that is unaffected by the components of food products and will not affect or alter the taste of those products, is secured to the upper edges of side walls 36 and spacing bars 40. The gasket 69 receives the under-surfaces of the sides and ends of the cover 68, thus forming a liquid-tight seal between the cover 68 and the body portion of the vibrating device.

The cover 68 is provided with an inlet 74 for the introduction of material to be screened. A directing plate 76 is positioned under and in register with the inlet 74, and that plate is supported by one of the cylindrical spacing bars 42 and the bar 43. With this construction, material can flow into the vibrating device through the inlet 74, strike the directing plate 76, be deflected toward the arcuate plate 56 on the end plate 50, strike arcuate plate 56 and then be directed toward the other end of the vibrating device. It is preferable to have the inlet end of the vibrating device below the outlet end; and where this is done, the solid and semi-solid components must work their way upwardly against the force of gravity before they can be discharged from the spouts 64 and 66. The arcuate plate 56 helps the material start up the screen. In this way the solid and semi-solid components remain on the surface of the porous screen for a longer time than they would if permitted to lie on a level or downwardly inclined screen. By forcing the solid or semi-solid components of the food products to remain in contact with the porous screen of the vibrating device for a longer time, the present invention separates a high percentage of the liquid components of those food products. This increases the efficiency of the vibrating device. Moreover, by forcing the material, to be screened, to strike plate 56 and be directed along a path of movement parallel to the screen, the present invention causes the fibers of the unscreened material to bridge the pores of the screen and pass freely along the screen. In the absence of this directed flow, the fibers of the material could become perpendicularly disposed relative to the screen and could partially enter the pores of the screen. This would be undesirable since it would plug those pores; and such plugging is minimized by the structure provided by the present invention.

The numeral 80 denotes a number of supporting projections which are secured to the outer surfaces of the side walls 36 of the vibrating device. Each of these projections 80 is provided with an opening therethrough, and that opening receives a J-shaped threaded hook 82. The hooks 82 extend through the openings in projections 80; and the arcuate ends of the hooks 82 overlie the upper edges and end faces of side walls 36. The arcuate ends of the hooks 82 can be pressed against the edges of cover 68 and end plates 50 and 62. The inner ends of the hooks 82 are threaded, and those ends are received by the rotatable interiorly-threaded clamps 81. Rotation of the clamps 81 will cause the hooks 82 to move toward the projections 80; and where the hooks 82 overlie the edges of cover 68 and end plates 50 and 62, rotation of clamps 81 will pull cover 68 and end plates 50 and 62 toward the body portion of the vibrating device. This will compress gaskets 60 and 69. A holding projection 79 is secured to each end of the bottom 38; and those projections are inclined to the end faces of the bottom 38 to form a V-shaped rest for the bottoms of the end plates 50 and 62. When the bottoms of the end plates 50 and 62 are inserted between projections 79 and the end faces of bottom 38, and when the clamps 81 are rotated to pull the cover 68 and end plates 50 and 62 against the body portion of the vibrating device, the gaskets 60 and 69 will be compressed and will provide a liquid-tight seal for the vibrating device. The clamps 81, hooks 82, and holding projections 79 are all on the exterior of the vibrating device; thus avoiding any need for an opening or openings in the cover 68 and end plates 50 and 62 in which liquid components could lodge and serve as a culture for the growth of bacteria.

Stiffening brackets are spaced along the exterior of the side walls 36, and those stiffening portions are denoted by the numeral 83. These brackets cooperate with the other elements of the vibrating device to make that device sturdy and capable of usage under all conditions.

A plurality of longitudinally-extending, guiding projections 84 are formed on the inner surfaces of the side walls 36 of the vibrating device. These projections may be formed integrally with the side walls 36, or they may be fabricated and then attached to those side walls. Where the projections 84 are attached to the side walls 36 of the vibrating device it is desirable that the joints or seams between the side walls 36 and those projections be filled with silver solder. In the construction shown in the drawing, there are two longitudinally-extending projections 84 on each side wall 36 of the vibrating device, thus providing that device with two "decks." However, it is obvious that where desired, a single projection 84 can be provided on each side wall 36 where a single "deck" vibrating device is desired. Flat or plane sections 37 are formed on the bottom 38 beneath the lower projections 84. These flat sections 37 will cooperate with the lower projections 84 to form guide-ways that extend through the length of the vibrating device. In the case of the upper projections 84, L-shaped angles 86 are spaced below those projections 84 and form guide-ways which extend through the length of the vibrating device. The guide-ways formed in this manner receive porous screens which have an open frame 88 and a woven or soldered "screen cloth" 90. The "screen cloth" 90 is pre-tensioned by attaching one edge thereof to one edge of the open frame 88, pulling the other edge of the "screen cloth" until it has the desired amount of tension, and then attaching the other edge of the "screen cloth" to the other edge of the open frame 88. The attachment can be done by soldering, welding, brazing or other means. Once made, the porous screen can easily be inserted into and removed from the guide-ways on the interior of the vibrating device. By using a pre-tensioned screen, there is no need to tension the screen after it is positioned within the vibrating device; and thus there is no need of having tensioning devices passing through the side walls of the vibrating device. In prior vibrating devices, used in the food industry for vibrating food products, the liquid components would leak out through the openings in the vibrating device which were needed for tensioning purposes. In addition, those openings would serve as lodging places for liquid components that could serve as a culture for the growth of bacteria. All of this is obviated by having a pre-tensioned screen which can easily be inserted into and removed from the vibrating device.

The spacing between the projections 84 and the L-shaped angles 86, and the spacing between the projections 84 and the flat sections 37 of bottom 38 is preferably quite large. In fact, those spacings are made large enough to facilitate the insertion of mops or rags in the guide-ways formed by projections 84, angles 86, and flat sections 37; and as a result, the guide-way can easily be kept clean and sanitary.

The pre-tensioned screens are removably held in position in the guide-ways by inserting flexible springs 92 between the overhanging shoulders 89 of the screens and the bottoms of the guide-ways. The springs 92 carry rotatable wheels 94 rotatably secured on opposite sides thereof. Some of the wheels 94 have their centers vertically spaced from the centers of alternate wheels 94. The flexible springs 92, which are shown as being slightly bent are preferably straight, and they are quite stiff although being bendable; the wheels 94 being so dimensioned that the distance between the overhanging shoulders 89 of the screens and the bottoms of the guide-ways is greater than the diameter of any of the wheels 94 and is less than the vertical distance between the top of one upper wheel 94 and the bottom of an adjacent lower wheel 94. With this arrangement, the springs 92 must be bent in order to get the wheels 94 to pass between the overhanging shoulders 89 of the screens and the bottoms of the guide-ways. As the springs bend to permit this action, they will force the overhanging shoulders 89 of the screens upwardly against the undersides of the longitudinally extending projections 84. This will hold the screens firmly in position against accidental dislodgment. Where desired, the outer edges of the screen may be coated with a resilient material that is unaffected by food products and will not affect or alter the taste of the food products; and this coating will be compressible to form a tight seal between the projections 84 and the screen. Consequently, any material that is placed on the screen and passes to the space below that screen must pass through the screen.

The upper portions of the longitudinally extending projections 84 are inclined to the horizontal, thus enabling them to act as "water sheds." As a result, the projections 84 can direct the food products toward the center of the screen.

The provision of the wheels 94 on springs 92 reduces the friction involved in inserting and removing the retaining members 92, and this enables the screens to be inserted and removed quite readily. The wheels 94 are not absolutely necessary, and it is possible to use a bare spring to hold the screens in position. For example, when the spring 96 is inserted between the overhanging shoulder 89 of the screen and the bottom of one on the guide-ways, that spring will perform the same functions as the wheel-carrying spring 92 performs. Of course the friction between the spring 96 and the overhanging shoulders 89 of the screens will be much greater than the friction between the wheels 94 and the overhanging shoulders 89, but the spring 96 is definitely usable.

Still another way of securing the screens in position within the vibrating device contemplates the use of a tube 98 of resilient material that is unaffected by food products and will not affect or alter the taste of those products. One such material is synthetic rubber, and where the tube 98 is made of synthetic rubber it will be air-tight. The tube 98 preferably is made with an inner lining 103 of fabric which will resist the tendency of the rubber of the tube 98 to expand in a longitudinal direction. Other expansion of tube 98 will be possible when fluid is forced into the tube under pressure. The tube 98 is air-tight, and it is preferably provided with a pressure relief valve 100; and it is provided with an inlet valve 102. The tubes 98 are removably positioned in the lower portions of the guide-ways, and they have a width and height which make it easy to insert and remove them while the screens 90 are in position in the vibrating device. Once the screens 90 are in position in the guide-ways, and once the tubes 98 are disposed between the shoulders 89 of the screens and the bottoms of the guide-ways, the tubes 98 may be inflated and expanded until they force the screens upwardly against the bottom portions of the projections 84. The tubes 98 may be expanded by any suitable means, as by connection to an air compressor or a bicycle pump, or by connection to a flask of gas under pressure. The tubes 98 can withstand large pressures, and thus they can exert sizable forces on the screens 90; and they can do this with but little exertion by the operator. To remove the tubes 98, the operator need only deflate them, as by pressing in on the valve, and then reach in and pull the tubes out of the guide-ways.

Use of springs 92 or 96 is desirable because it is possible to provide extra sets of those springs which can be scoured and scalded without keeping the vibrating device idle. Similarly additional screens 90 can be provided so the ones not in use can be sterilized preparatory to their insertion in the vibrating device. The springs 92 and 96 can easily be removed from the guide-ways by using a tool which fits into the notches 93 and 95 in the left hand ends of springs 92 and 96.

With this construction, food products can be introduced into the inlet 74, strike the directing plate 76, be deflected against the arcuate plate 56 of end plate 50, and then be directed upwardly along the surface of the screen. The vibration-imparting elements positioned within the cylindrical housings 26 will then provide a movement and vibration which will cause the solid and semi-solid components of the food products to move upwardly along the screens, while the liquid components pass through the screens. The liquid components will issue from spout 54 and the solid or semi-solid components will issue from spouts 64 and 66. This operation can be continuous since there is no limitation to the amount of material that passes over the screens, and the extracted fluid components can flow out through spout 54.

By having all parts of the vibrating device made of metal or rubber, it is possible to pass heated fluids through the device. This is sometimes desirable in the treatment of food products.

At the conclusion of a run, the device can be disassembled quickly by rotating the clamps 81, moving the hooks 82 away from the cover 68 and the end plates 50 and 62, lifting up the cover by handles 70, and lifting end plates 50 and 62 away from the projections 79. Thereafter, the screens 90 can be freed, either by deflating the tubes 98 or by pulling out the springs 92 or 96; and then those screens can easily be grasped and bodily removed from the vibrating device. Water or steam hoses can then be played directly through the vibrating device, or mops and cloths inserted in the remarkably unobstructed interior of the device. Once this has been done, the screens and the springs, which have been suitably cleaned, or substitute screens and springs can be replaced.

In the drawing, two screens are shown in the vibrating device. Where two screens are provided in one device it is usual, but not necessary, to make the upper screen with a coarser mesh than the lower screen. Such an arrangement makes it possible to obtain solid or semi-solid products of different sizes from spouts 64 and 66. By placing suitable containers adjacent those spouts, it is possible to collect the desired products.

Whereas the drawing and accompanying description have shown several preferred embodiments of the present invention it should be obvious to those skilled in the art that various changes may be made in the form of the invention without affecting the scope thereof.

What I claim is:

1. In a vibrating device that comprises a stationary base, a vibrating member yieldably mounted on said base, and means to impart vibratory movement to said vibrating member, the improvement which comprises a porous screen, spaced supports for said screen that are positioned within said vibrating member and are substantially horizontal, said supports being spaced apart to define recesses of fixed dimensions into which the edges of said screen can be inserted, and locking members that are disposable between said edges of said screen and two of said supports and that press said edges against other of said supports, said locking members being resilient bars of metal with axles thereon and with rollers on said axles, said axles being spaced apart vertically whereby the vertical distance between the top of one roller and the bottom of another roller is greater than the maximum gaps between said edges of said screen and said two supports whenever said edges are in said recesses, said rollers rotating to facilitate insertion and removal of said locking members.

2. In a vibrating device that comprises a stationary base, a vibrating member yieldably mounted on said base, and means to impart vibratory movement to said vibrating member, the improvement which comprises a porous screen, spaced supports for said screen that are positioned within said vibrating member and are substantially horizontal, said supports being spaced apart to define recesses of fixed dimensions into which the edges of said screen can be inserted, and locking members that are disposable between said edges of said screen and two of said supports and that press said edges against other of said supports, said locking members being resilient bars of metal with axles thereon and with rollers on said axles, said axles being spaced apart vertically whereby the vertical distance between the top of one roller and the bottom of another roller is greater than the maximum gaps between said edges and said two supports whenever said edges are in said recesses, said rollers rotating to facilitate insertion and removal of said locking members, some of said axles being secured to the tops of said bars and other of said axles being secured to the bottoms of said bars, said bars being bent to have an undulating configuration.

3. In a vibrating device that comprises a stationary base, a vibrating member yieldably mounted on said base, and means to impart vibratory movement to said vibrating member, the improvement which comprises a porous screen mounted within said vibrating member, said screen being inclined to the horizontal and discharging unscreenable material from the upper end thereof, a concave baffle plate disposed a short distance above the lower end of said screen, an inlet for said vibrating device that is intermediate the center and the lower end of said screen and that is disposed above said screen, and a directing plate that is below said inlet and that is inclined downwardly toward the lower end of said screen and toward said baffle plate, said directing plate having the lower end thereof adjacent said baffle plate whereby said directing plate receives pulp from said inlet and directs said pulp against the concave surface of baffle plate, said baffle plate halting said pulp and directing said pulp toward the upper end of said screen in a direction parallel to said screen.

4. In a vibrating device that comprises a stationary base, a vibrating member yieldably mounted on said base, and means to impart vibratory movement to said vibrating member, the improvement which comprises a rigid porous screen, flanges on said screen that extend outwardly from the longitudinal edges of said screen and that lie in the plane of the top of said screen, said flanges being thinner than said screen whereby the bottom faces of said flanges are disposed above the level of the bottom of said screen, upper and lower supports for said screen that are positioned wholly within said vibrating member, said upper and lower supports being vertically spaced apart to define recesses of fixed dimensions into which said flanges can extend, said upper and lower supports being rigid and unyielding, said flanges directly engaging and being confined by said upper supports, and resilient locking elements of metal that are disposable between said lower supports and the bottom faces of said flanges and that directly engage said flanges and said lower supports and that force said flanges into engagement with said upper supports, said resilient locking elements being dimensioned to the normal overall heights thereof are greater than the maximum gaps between the said lower supports and the bottom faces of said flanges whenever said flanges extend into the recesses defined by said supports, said resilient locking elements being deformable to permit their introduction into and removal from said gaps, said supports and said resilient locking members constituting the sole mounting for said screen.

5. In a vibrating device that comprises a stationary base, a vibrating member yieldably mounted on said base, and means to impart vibratory movement to said vibrating member, the improvement which comprises a rigid porous screen, spaced supports for said screen that are positioned wholly within said vibrating member, said supports being spaced apart to define recesses of fixed dimensions into which the longitudinal edges of said screen can extend, said supports being rigid and unyielding, said edges of said screen directly engaging and being confined by two of said supports, and resilient locking elements of metal that are disposable between said edges of said screen and other of said supports and that directly engage said edges and said other supports and that force said edges into engagement with said two supports, said resilient locking elements being dimensioned so the normal overall heights thereof are greater than the maximum gaps between said edges and said other supports whenever said edges extend into said recesses, said resilient locking elements being deformable to permit their introduction into and removal from said gaps, said supports and said resilient locking members constituting the sole mounting for said screen.

LEWIS E. SOLDAN.

References Cited in the file of this patent

UNITED STATES PATENTS

| Number | Name | Date |
|---|---|---|
| 416,464 | Laufenberg | Dec. 3, 1889 |
| 852,050 | Barbeau | Apr. 30, 1907 |
| 2,019,547 | Theobold | Nov. 5, 1935 |
| 2,077,678 | Delamater | Apr. 20, 1937 |
| 2,089,548 | Frantz et al. | Aug. 10, 1937 |
| 2,114,406 | Simpson | Apr. 19, 1938 |
| 2,127,397 | Freedlander | Aug. 16, 1938 |
| 2,213,773 | Symons | Sept. 3, 1940 |
| 2,217,920 | Roubal | Oct. 15, 1940 |
| 2,247,978 | Van Arkel | July 1, 1941 |
| 2,271,900 | Mowbray | Feb. 3, 1942 |
| 2,279,042 | Harrington | Apr. 7, 1942 |
| 2,297,700 | Hinkle | Oct. 6, 1942 |
| 2,415,268 | Wendt | Feb. 4, 1947 |